(12) United States Patent
Barnwell et al.

(10) Patent No.: US 7,128,993 B2
(45) Date of Patent: Oct. 31, 2006

(54) COMPOSITE MEMBRANE

(75) Inventors: David Edward Barnwell, Wiltshire (GB); Silvain Buche, Reading (GB); Lorenz Gubler, Nussbaumen (CH); Thomas Robertson Ralph, Reading (GB)

(73) Assignee: Johnson Matthey Public Limited Company, London (GB)

( * ) Notice: Subject to any disclaimer, the term of this patent is extended or adjusted under 35 U.S.C. 154(b) by 626 days.

(21) Appl. No.: 10/429,142

(22) Filed: May 2, 2003

(65) Prior Publication Data

US 2004/0009385 A1    Jan. 15, 2004

(30) Foreign Application Priority Data

May 3, 2002  (GB) .................... 0210194.7

(51) Int. Cl.
*H01M 8/10* (2006.01)

(52) U.S. Cl. ..................... 429/30; 429/33; 204/296

(58) Field of Classification Search ................. 429/30, 429/33; 204/296
See application file for complete search history.

(56) References Cited

U.S. PATENT DOCUMENTS

| | | | |
|---|---|---|---|
| 3,282,875 A | 11/1966 | Connolly et al. | |
| 4,329,435 A | 5/1982 | Kimoto et al. | |
| 4,330,654 A | 5/1982 | Ezzell et al. | |
| 4,358,545 A | 11/1982 | Ezzell et al. | |
| 4,417,969 A | 11/1983 | Ezzell et al. | |
| 4,433,082 A | 2/1984 | Grot | |
| 4,610,762 A | 9/1986 | Birdwell | |
| 4,940,525 A | 7/1990 | Ezzell et al. | |
| 5,094,995 A | 3/1992 | Butt et al. | |
| 5,438,082 A | 8/1995 | Helmer-Metzmann et al. | |
| 5,468,574 A | 11/1995 | Ehrenberg et al. | |
| 5,595,676 A | 1/1997 | Barnes et al. | |
| 5,599,639 A | 2/1997 | Sansone et al. | |
| 6,042,958 A * | 3/2000 | Denton et al. | 429/30 |
| 6,689,501 B1 * | 2/2004 | Stone et al. | 429/30 |
| 2004/0208993 A1 * | 10/2004 | Fongalland et al. | 427/243 |

FOREIGN PATENT DOCUMENTS

| | | |
|---|---|---|
| CA | 2098238 | 12/1993 |
| EP | 0 331 321 A2 | 9/1989 |
| EP | 0 345 964 A1 | 12/1989 |
| EP | 0 450 849 A2 | 10/1991 |
| EP | 0 875 524 A2 | 11/1993 |
| EP | 0 838 872 A2 | 4/1998 |
| WO | WO-94/16002 | 7/1994 |
| WO | WO-95/08581 | 3/1995 |
| WO | WO-97/25369 | 7/1997 |
| WO | WO-00/23510 | 4/2000 |
| WO | WO-00/24075 | 4/2000 |
| WO | WO-00/35037 | 6/2000 |

* cited by examiner

*Primary Examiner*—Tracy Dove
(74) *Attorney, Agent, or Firm*—RatnerPrestia

(57) ABSTRACT

The present invention relates to a composite membrane comprising at least one ion-conducting polymer and a network of randomly orientated individual fibers, wherein there is a continuous region of the membrane at one or both of the membrane faces wherein the density of fibers is lower than the density of fibers in the membrane as a whole. The invention further relates to processes for manufacturing membranes according to the invention, and membrane electrode assemblies comprising membranes according to the invention.

19 Claims, 1 Drawing Sheet

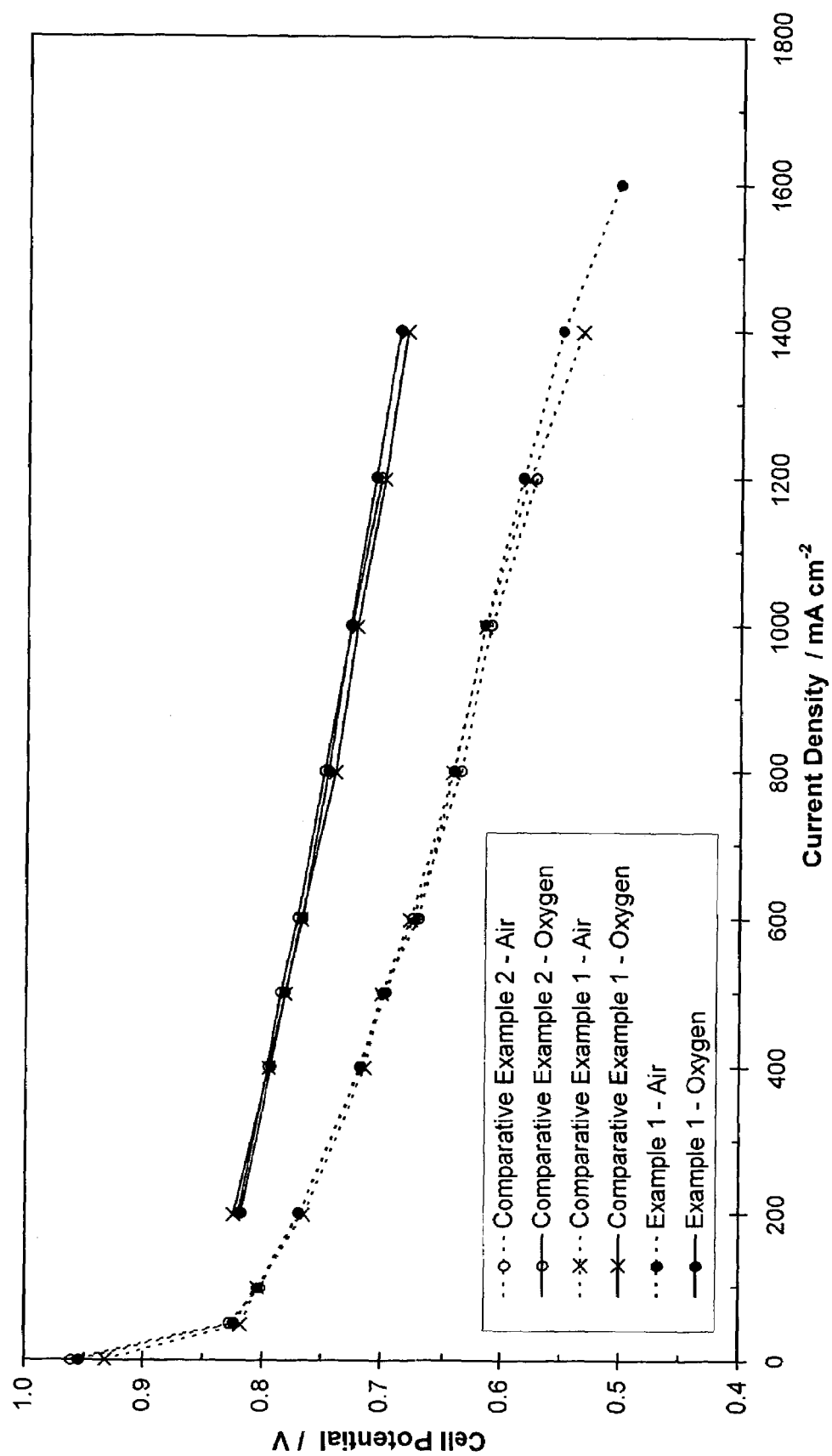
FIGURE 1 Single Cell Performance of MEAs

COMPOSITE MEMBRANE

The present invention relates to a composite membrane which is of use in electrochemical devices, particularly fuel cells, and a process for the manufacture of the composite membrane.

Electrochemical cells invariably comprise at their fundamental level a solid or liquid electrolyte and two electrodes, the anode and cathode, at which the desired electrochemical reactions take place. A fuel cell is an energy conversion device that efficiently converts the stored chemical energy of a fuel and an oxidant into electrical energy. The fuel is usually hydrogen, stored as a gas, or methanol stored as a liquid or gas, and the oxidant is air or oxygen. The hydrogen or methanol is oxidised at the anode and the oxygen is reduced at the cathode. In these cells gaseous reactants and/or products have to be diffused into and/or out of the electrode structures forming the cell. The electrodes therefore are specifically designed to be porous to gas diffusion in order to optimise the contact between the reactants and the reaction sites in the electrode to maximise the reaction rate. The electrolyte which has to be in contact with both electrodes to maintain ionic contact in the fuel cell may be acidic or alkaline, liquid or solid, in nature. In the proton exchange membrane fuel cell (PEMFC), whether hydrogen or methanol fuelled, the electrolyte is a solid proton conducting polymer membrane, commonly based on perfluorosulphonic acid materials. The PEMFC is the most likely type of fuel cell to find wide application as a more efficient and lower emission power generation technology in a range of markets including stationary and portable power devices and as alternative to the internal combustion engine in transportation.

In the PEMFC the combined laminate structure formed from the membrane and the two electrodes is known as a membrane electrode assembly (MEA). The MEA will typically comprise several layers, but can in general be considered, at its basic level, to have five layers, which are defined principally by their function. On either side of the membrane an anode and cathode electrocatalyst layer is incorporated to increase the rates of the desired electrode reactions. In contact with the electrocatalyst containing layers, on the opposite face to that in contact with the membrane, are the anode and cathode gas diffusion substrates (GDS).

The complete MEA can be constructed by several methods. The electrocatalyst layers can be bonded to one surface of the GDS to form what is known as a gas diffusion electrode (GDE). The MEA is then formed by combining two GDEs with the solid proton-conducting membrane. Alternatively, the MEA may be formed from two porous GDSs and a solid proton-conducting polymer membrane catalysed on both sides (hereinafter referred to as a catalyst coated membrane or CCM); or indeed the MEA may be formed from one GDE and one GDS and a solid proton-conducting polymer membrane catalysed on the side facing the GDS. Conventionally, the solid proton conducting membrane electrolytes used in the PEMFC and other devices are selected from commercially available membranes, for example perfluorinated sulphonic acid membranes sold under the trade names Nafion® (E. I. DuPont de Nemours and Co.), Aciplex® (Asahi Kasei) and Flemion® (Asahi Glass KK). It is necessary with these membranes that a high level of water is present within the membrane to provide efficient proton hydration and thus high proton conductivity. For application in the PEMFC the membranes are typically below 200 μm in thickness to provide a high level of proton conductivity. Indeed, there is a drive to increasingly thinner membranes of 50 μm and below, particularly for transportation applications, to raise the electrical efficiency of the MEA at higher power densities and to simplify the water management.

The dimensional changes that occur as the level of water content of the membrane changes are a particular problem during fabrication of the MEA. The stresses caused by changes in the membrane hydration during the conventionally employed thermal bonding process can be sufficiently large to break the bond between the catalyst and the membrane, or the catalyst and the substrate. Furthermore, the dimensional changes lead to considerable difficulties in handling membranes during the fabrication of large area MEAs of, for example, greater than 500 cm². The thinner the membrane, the more difficult the handling becomes. Finally, the dimensional changes may affect the durability of the MEA when it is incorporated into a fuel cell. Membrane creep may occur, eventually leading to pin-holing of the membrane and ultimate MEA failure.

To address the problems associated with the dimensional change of membranes, composite membrane structures have been prepared. One recent approach to a composite membrane structure is described in EP 875 524. The membrane comprises a porous substrate of randomly orientated individual fibres and at least one ion conducting polymer, wherein the ion conducting polymer is embedded within the porous substrate. The membrane may be manufactured by taking a pre-formed substrate of randomly orientated individual fibres and thereafter applying the polymeric material. Alternatively, the membrane may be manufactured by casting or extruding a mixture of the fibres and a polymeric melt or a solution of the polymeric material under controlled temperature and pressure to produce a sheet of the composite membrane containing the fibres and the polymer.

The composite membrane structures described in EP 875 524 have fibres distributed throughout the thickness of the membrane and therefore have fibres at the surface of the membrane sheet. As a result, when the membrane is incorporated into an MEA, fibres are present at the interfaces of the anode and the cathode with the membrane. The present inventors have found that, in some circumstances, these fibres may provide a pathway for the reactant hydrogen and oxygen gases within the membrane or the electrocatalyst layers to diffuse through the composite membrane to the cathode and anode, respectively, resulting in significant rates of reactant gas cross-over. This is especially problematical for thinner composite membranes less than 50 μm thick, desired for improved MEA electrical efficiencies at high power densities. The recombination of hydrogen and oxygen due to the reactant gas cross-over generates heat, which is likely to cause pin-holing of the membrane and, therefore, failure of the MEA. This would severely restrict the durability of the PEMFC. Additionally, reactant gas cross-over through the membrane will result in a loss of reactant and will lower the cell potential, reducing the efficiency of the PEMFC. The present inventors have sought to reduce the rate of reactant gas cross-over through composite membranes and especially through thin (less than 50 μm) composite membranes.

Accordingly, the present invention provides a composite membrane comprising at least one ion-conducting polymer and fibres, characterised in that there is a continuous region of the membrane at one or both of the membrane faces wherein the density of fibres is lower than the density of fibres in the membrane as a whole. Suitably the fibres are present in the membrane as a network of randomly orientated individual fibres.

The density of fibres can be defined as the number of fibres per unit volume in the membrane. The fibre density throughout the membrane can be assessed by analysing cross-sections through the membrane with an optical or an electron microscope. This technique is within the competence of the person skilled in the art. Several cross-sections through the membrane must be taken to establish how the fibre density varies throughout the membrane.

The inventors have found that by decreasing the fibre density at a continuous region at one or both membrane faces, gas cross-over through the composite membrane can be reduced. The membranes retain the mechanical strength and dimensional stability associated with composite membranes.

There will be local variations in fibre density throughout a membrane as described in EP 875 524. However, in the present invention there is an identifiable "continuous region" at one or both membrane faces that has a lower fibre density. The "continuous region" of the membrane covers at least 25% of the surface area of the membrane, preferably at least 50%, most preferably 100%. The thickness of the region is suitably at least 10% of the membrane thickness, preferably at least 20% of the membrane thickness, most preferably at least 30% of the membrane thickness.

The continuous region of the membrane suitably contains less than 10% of the fibres in the membrane, preferably less than 5%. In a preferred embodiment, the fibre density in the continuous region is zero, i.e. there are no fibres in the continuous region. In a particularly preferred embodiment, the continuous region covers the entire surface area of the membrane and contains no fibres.

In one embodiment of the invention, a continuous region with lower fibre density is present at only one membrane face. Such a region can significantly reduce the gas cross-over through a membrane. In a second embodiment, a continuous region with low fibre density is present at each membrane face.

For PEMFC applications, the ion-conducting polymer is a proton conducting polymer, examples of such polymers being well known to those skilled in the art. The proton conducting polymers suitable for use in the present invention may include, but are not limited to:

1) Polymers which have structures with a substantially fluorinated carbon chain optionally having attached to it side chains that are substantially fluorinated. These polymers contain sulphonic acid groups or derivatives of sulphonic acid groups, carboxylic acid groups or derivatives of carboxylic acid groups, phosphonic acid groups or derivatives of phosphonic acid groups and/or mixtures of these groups. Perfluorinated polymers include Nafion®, Flemion® and Aciplex® commercially available from E. I. DuPont de Nemours (U.S. Pat. Nos. 3,282,875; 4,329,435; 4,330,654; 4,358,545; 4,417,969; 4,610,762; 4,433,082 and 5,094,995), Asahi Glass KK and Asahi Kasei respectively. Other polymers include those covered in U.S. Pat. No. 5,595,676 (Imperial Chemical Industries plc) and U.S. Pat. No. 4,940,525 (Dow Chemical Co.)

2) Perfluorinated or partially fluorinated polymers containing aromatic rings such as those described in WO 95/08581, WO 95/08581 and WO 97/25369 (Ballard Power Systems) which have been functionalised with $SO_3H$, $PO_2H_2$, $PO_3H_2$, $CH_2PO_3H_2$, COOH, $OSO_3H$, $OPO_2H_2$, $OPO_3H_2$. Also included are radiation or chemically grafted perfluorinated polymers, in which a perfluorinated carbon chain, for example, PTFE, fluorinated ethylene-propylene (FEP), tetrafluoroethylene-ethylene (ETFE) copolymers, tetrafluoroethylene-perfluoroalkoxy (PFA) copolymers, poly (vinyl fluoride) (PVF) and poly (vinylidene fluoride) (PVDF) is activated by radiation or chemical initiation in the presence of a monomer, such as styrene, which can be functionalised to contain an ion exchange group.

3) Fluorinated polymers such as those disclosed in EP 0 331 321 and EP 0345 964 (Imperial Chemical Industries plc) containing a polymeric chain with pendant saturated cyclic groups and at least one ion exchange group which is linked to the polymeric chain through the cyclic group.

4) Aromatic polymers such as those disclosed in EP 0 574 791 and U.S. Pat. No. 5,438,082 (Hoechst AG) for example sulphonated polyaryletherketone. Also aromatic polymers such as polyether sulphones which can be chemically grafted with a polymer with ion exchange functionality such as those disclosed in WO 94/16002 (Allied Signal Inc.).

5) Nonfluorinated polymers include those disclosed in U.S. Pat. No. 5,468,574 (Dais Corporation) for example hydrocarbons such as styrene-(ethylene-butylene)-styrene, styrene-(ethylene-propylene)-styrene and acrylonitrile-butadiene-styrene co- and terpolymers where the styrene components are functionalised with sulphonate and/or phosphonic groups.

6) Nitrogen containing polymers including those disclosed in U.S. Pat. No. 5,599,639 (Hoechst Celanese Corporation), for example, polybenzimidazole alkyl sulphonic acid and polybenzimidazole alkyl or aryl phosphonate.

7) Any of the above polymers which have the ion exchange group replaced with a sulphonyl chloride ($SO_2Cl$) or sulphonyl fluoride ($SO_2F$) group rendering the polymers melt processable. The sulphonyl fluoride polymers may form part of the precursors to the ion exchange membrane or may be arrived at by subsequent modification of the ion exchange membrane. The sulphonyl halide moieties can be converted to a sulphonic acid using conventional techniques such as, for example, hydrolysis.

To increase the proton conductivity of proton-conducting membranes they may be doped with organic or inorganic proton conductors, thus increasing the proton concentration within the pores. Suitable dopants include low volatility acidic melts or solutions, or acidic solids. Preferred dopants include $Zr(HPO_4)_2$, heteropolyacids, phosphoric acid and 1-butyl, 3-methyl imidazolium trifluoromethane sulfonate (BMITf).

Ion-conducting polymers which are not proton conducting polymers may also be used for non-PEMFC applications. For example, such polymers can be used for applications requiring a bipolar membrane or a completely anion exchange membrane. Anion exchange polymers are generally based on quaternary ammonium groups, rather than the fixed sulphonic acid groups in proton conducting polymers. These include, for example, the tetraalkyl ammonium group ($—N^+R_3$) and the quaternary ammonium centre in Tosflex® membranes ($—N(R_1)(CH_2)_xN^+(R_3)$) supplied by Tosoh. However, it can be envisaged that all of the proton exchange polymers described above could have anion exchange equivalents.

The membrane of the invention may comprise more than one ion-conducting polymer. The polymer in the continuous region(s) of the membrane with low fibre density, may be the same or different to the polymer in the rest of the membrane.

Suitably for applications in fuel cells, the total thickness of the composite membrane is less than 200 µm, the exact thickness being dependent on the type of application envisaged. The present invention is particularly useful for thin membranes which are usually less than 100 μm and preferably less than 50 μm.

Fibres which are suitable for use in the present invention are non-conducting fibres such as glass, polymer, ceramic, quartz or silica fibres. Preferably, the fibres are glass, quartz or silica fibres; most preferably the fibres are amorphous silica fibres. For example, "Quartzel" silica multifilaments are available from Saint Gobain Quartz PLC. Fibres are typically of diameters in the range of 0.1 μm to 15 μm, preferably 0.2 μm to 10 μm. Fibres are typically of lengths in the range of 0.05 mm to 300 mm, preferably 0.5 mm to 25 mm. The fibres are suitably incorporated into the composite membrane at a fibre loading of 1 to 25 wt % compared to the weight of the ion-conducting polymer, more preferably at a fibre loading of 2 to 10 wt %.

Composite membranes according to the invention may be manufactured by a number of different processes that are well-known to the person skilled in the art.

In a first process, the membrane is fabricated by a multi-layer coating process. Suitable coating processes include printing, K-bar, gap coating, doctor blade and spraying, but preferred processes are gap coating processes such as knife over roll coating or die coating. A first coating composition comprising polymeric materials (either as a melt or a solution) and optionally comprising fibres is coated onto a backing layer to form a first polymer layer. A second coating composition comprising polymeric materials (either as a melt or a solution) and optionally comprising fibres is subsequently coated onto the first polymer layer to form a second polymer layer. At least one of the two coating compositions must comprise fibres. In a particular embodiment, the first coating composition has a lower ratio of fibre: polymer than the second composition such that the first polymer layer has a lower fibre density than the second polymer layer. In a preferred embodiment, the first coating composition does not contain fibres, so that the first polymer layer does not contain fibres. Optionally, one or more additional coating compositions can be coated onto the second polymer layer to form additional polymer layers. In a preferred embodiment, the membrane is fabricated from three coating compositions: a first coating composition comprising polymeric material and no fibres, a second coating composition comprising polymeric material and fibres, and a third coating composition comprising polymer material and no fibres. In this embodiment, a membrane with fibre-free regions on both membrane faces is produced.

In a second process, a first coating composition comprising polymeric materials (either as a melt or a solution) and optionally comprising fibres is coated onto a pre-formed membrane instead of a backing layer. The pre-formed membrane may or may not contain fibres. If the first coating composition does not comprise fibres, the membrane must contain fibres. If the first coating composition does comprise fibres, the membrane can be fibre-free.

In a third process, a first membrane comprising a network of fibres is laminated to a second membrane that does not contain any fibres. The first membrane may be produced by a number of methods that are known in the art. The fibre network may be pre-formed by combining fibres with a binder material, preferably in a wet-lay process or dry lay process. Such pre-formed networks are disclosed in WO 00/23510 and WO 00/24075. Subsequently, an ion-conducting polymer may be embedded in the fibre network by processes such as printing, rolling, K-bar, doctor blade methods, spraying or thin film casting. Alternatively, the first membrane may be produced by casting or extruding a mixture containing the fibres and a solution or melt of an ion-conducting polymer. The second membrane may comprise a polymeric sheet material such as Nafion® available from E. I. DuPont de Nemours and Co, or Flemion® available from Asahi Glass KK. Alternatively, the second membrane may be produced by casting or extruding a solution or melt of any ion-conducting polymer to produce a sheet of polymer membrane. The first membrane and the second membrane are combined together and laminated to form a single composite membrane. Optionally, a third membrane that does not contain fibres is laminated to the opposite side of the first membrane, such that the first membrane is interposed between the second and third membranes.

In a fourth process, the membrane is produced in a multi-layer extrusion process. Two or more materials are extruded through a single die with two or more orifices, arranged so that the extrudates merge and weld or bond together before solidifying. One of the materials is a mixture containing fibres and a solution or polymer melt of an ion-conducting polymer. A second material is a solution or polymer melt of an ion-conducting polymer.

In a fifth process, the membrane is co-moulded, preferably using an injection moulding process. Two or more materials are injected through separate nozzles into the same mould or into several moulds. The materials can be granular, powdered thermosets or thermoplastics, or can be solutions. One of the materials contains a mixture of fibres and an ion-conducting polymer. A second material is an ion-conducting polymer in a suitable form.

In any of the processes described above, the ion-conducting polymer may be used in a precursor form, especially a form that is melt processable.

A further aspect of the invention provides a catalysed membrane comprising a composite membrane according to the invention. An appropriate catalyst (such as those disclosed in EP 450 849, EP 838 872 and WO 00/35037) is applied to one or both sides of the composite membrane, by a technique such as screen printing, spraying or decal transfer.

A further aspect of the invention provides membrane electrode assemblies comprising composite membranes according to the invention. The MEA may be formed from the composite membrane and two catalysed GDEs. Alternatively, the membrane may be catalysed on both sides, and combined with two GDSs. Finally, the membrane may be catalysed on one side, and may be combined with one GDE and one GDS facing the catalysed face of the composite membrane. The MEA may be produced using lamination techniques that are well known to those skilled in the art.

In a first embodiment, the MEA according to the invention comprises a composite membrane wherein a continuous region with lower fibre density is present at only one membrane face, and the region is adjacent to the cathode of the MEA. In a second embodiment, the MEA comprises a composite membrane wherein a continuous region with lower fibre density is present at only one membrane face, and the region is adjacent to the anode of the MEA. In a third embodiment, the MEA comprises a composite membrane wherein continuous regions with low fibre density are present at both membrane faces, so that such regions are adjacent to both electrodes.

The present invention will now be described by way of example only which is not intended to be limiting thereof.

COMPARATIVE EXAMPLE 1

Composite Membrane Comprising a Fibre Network

Amorphous silica fibres (Quartzel, 7 μm, C7 22–12 mm QS13, from Saint Gobain Quartz PLC) were processed in a grinder, cleaned in 5M NaOH solution at 90° C. for 30 minutes, rinsed with water, filtered and dried at 80° C. overnight. 0.22 g of fibres were added to 41 g of Flemion® FSS-1 solution (9 wt % polymer, equivalent weight 909 g/mol H$^+$, from Asahi Glass KK) to give a fibre loading of 6 wt %. The solution and fibre was blended using a Silverson mixer until the fibres were well-dispersed. The dispersion was poured into a casting boat with a surface area of 884 cm$^2$ and dried in a pre-heated oven at 90° C. for two hours.

The membrane was removed from the casting boat and pressed at 690 kPa absolute and at a temperature of 177° C. for 6 minutes. The resulting membrane was approximately 30 μm thick. The membrane was soaked in 0.5 M $H_2SO_4$ at room temperature for 48 hours, rinsed with deionised water, and immersed in deionised water at room temperature for 24 hours. The membrane was dried at 35° C. for 16 hours and used to fabricate MEAs.

COMPARATIVE EXAMPLE 2

Flemion® SH-30 Membrane

A Flemion® SH-30 membrane was obtained from Asahi Glass KK. The membrane was approximately 30 μm thick. The membrane was used as received.

EXAMPLE 1

Composite Membrane Having a Continuous Region with Low Fibre Density, Produced by a Lamination Process A polymer sheet containing a network of fibres was prepared as in Comparative Example 1 except that 0.22 g of amorphous silica fibres (Quartzel, 7 μm, C7 22–12 mm QS13, from Saint Gobain Quartz PLC) and 14 g Flemion® FSS-1 solution (9 wt % polymer, equivalent weight 909 g/mol H$^+$, from Asahi Glass KK) were used. This produced a membrane that was approximately 10 μm thick. A pure Flemion® sheet using Flemion® FSS-1 solution (27 g of 9 wt % polymer, equivalent weight 909 g/mol H$^+$, from Asahi Glass KK) was prepared without the addition of any fibres, producing an un-reinforced membrane that was approximately 20 μm thick. The Flemion® sheet was laminated to the sheet containing the fibre network at a pressure of 690 kPa absolute and a temperature of 177° C. for 6 minutes. The resulting laminated composite membrane was approximately 30 μm thick and had an overall fibre loading of 6 wt %. The membrane was soaked in 0.5 M $H_2SO_4$ at room temperature for 48 hours, rinsed with deionised water, and immersed in deionised water at room temperature for 24 hours. The membrane was dried at 35° C. for 16 hours and used to fabricate MEAs.

EXAMPLE 2

Composite Membrane Having Continuous Regions with Low Fibre Density at Both Membrane Faces, Produced by a Gap Coating Process Two coating compositions were used:
1) Polymer-only solution containing 15% Flemion® FSS-1 (equivalent weight 909 g/mol H$^+$, from Asahi Glass KK).
2) A mixture of polymer solution and fibres containing 15 wt % Flemion® FSS-1 and amorphous silica fibres (Quartzel, 7 μm, C7 22–12 mm QS13, from Saint Gobain Quartz PLC) was prepared using a high shear mixer (e.g. Silverson Mixer) to give 6 wt % fibres with respect to the polymer.

A roll of membrane was produced in a continuous gap coating process. A first polymer layer of approximately 5 μm thickness was produced by coating the first coating composition onto a backing film providing support and release characteristics. A second polymer layer of approximately 25 μm thickness was produced by coating the second coating composition onto the first polymer layer. A third polymer layer of approximately 10 μm thickness was produced by coating the first coating composition onto the second polymer layer. The membrane was dried. The final membrane thickness is approximately 40 μm and the membrane comprises fibre-free regions at both membrane faces.

COMPARATIVE EXAMPLE 3

Fibre-Free Membrane, Produced by a Gap Coating Process

A 40 μm thick membrane was fabricated using the gap coating process used in Example 2. The fibre-free first coating composition described in Example 2 was used to form all the polymer layers.

MEA Fabrication

The membranes of Comparative Example 1, Comparative Example 2 and Example 1, were fabricated into MEAs. The cathode catalyst comprised platinum supported on Vulcan XC72-R carbon black at a loading of 40 wt %. The anode catalyst comprised a platinum/ruthenium alloy supported on Vulcan XC72-R carbon black at a loading of 40 wt % Pt and 20 wt % Ru to give a 50:50 atomic ratio of platinum to ruthenium. The cathode and anode catalysts were applied at a loading of 0.4 mgPt cm$^{-2}$ to carbon paper based gas diffusion substrates (TGP-H-060 from Toray Industries, Japan) to form GDEs. The GDEs were laminated to the membrane to produce MEAs by hot pressing.

The MEAs were assembled into a single cell of 50 cm$^2$ active area and evaluated for performance and the rate of $H_2$ cross-over and $N_2$ leak-rate through the membrane of the MEAs.

Single Cell Performance

The MEA performance in terms of the cell potential at selected current densities was measured using $H_2$ as fuel and air or $O_2$ as oxidant. The cell temperature was 80° C. and the gas stoichiometries 1.5 for $H_2$, 2.0 for air and 10.0 for $O_2$ with reactant gas humidification to give 100% relative humidity. While for practical operation air is the typical oxidant, using pure $O_2$ as oxidant allows the membrane performance to be isolated by minimising the performance loss in the GDEs.

FIG. 1 shows the single cell performance of the MEAs manufactured from the membranes of Example 1, Comparative Example 1 and Comparative Example 2. The MEA performances are comparable and are typical of MEAs that are functioning satisfactorily under the selected single cell operating conditions. Particularly significant is the similar performances with pure $O_2$ as oxidant. This suggests that the composite membrane of the invention (Example 1) performs comparably to un-reinforced Flemion SH-30 (Comparative Example 2) and to composite membranes prepared according to the prior art (Comparative Example 1), as disclosed in EP 875 524. That the membranes all exhibited a comparable resistance was confirmed by the similar MEA resistance of 0.06–0.07 Ωcm$^2$ recorded in-situ using the current-interrupt technique during the measurement of FIG. 1. The composite membrane of the invention (Example 1) does not show an increase in resistance due to the reinforcement. This is an important feature of the composite membrane of the invention and is in keeping with the resistance of composite membranes prepared according to the prior art (Comparative Example 1).

The cell potential with no current flowing through the MEA, often defined as the open circuit voltage (OCV), can be used as a guide to the H$_2$ gas cross-over from the anode to the cathode. As shown in FIG. 1 the OCV of Example 1 at 0.955V is higher than the 0.933V for Comparative Example 1 and is comparable to the 0.961V for Comparative Example 2. This suggests a lower rate of H$_2$ gas cross-over through the composite membrane of the invention (Example 1), compared with the composite membrane prepared according to the prior art (Comparative Example 1). The rate of H$_2$ cross-over more closely resembles the H$_2$ permeability through the un-reinforced Flemion SH-30 membrane (Comparative Example 2), which is a fundamental property of the membrane material.

Gas Cross-Over and Gas Leak-Rate Measurements

The rate of H$_2$ gas cross-over from the anode to the cathode of the MEA of Example 1, Comparative Example 1 and Comparative Example 2 was measured electrochemically. Maintaining the cell at 80° C. and the reactant gas pressure at 200 kPa absolute, H$_2$ (100% relative humidity) and N$_2$ (100% relative humidity) were passed through the anode and cathode compartment respectively at a flow rate of 0.2 slpm. A current density of 50 mAcm$^{-2}$ was sustained for 10 minutes to remove residual O$_2$ from the cathode compartment. The cell potential was varied from 200 to 800 mV (in 100 mV steps) and the current density measured after 30 s. Extrapolating the linear region of the plot of cell potential vs. current density to 0 mV (to minimise the effect of membrane resistance) allowed comparison of the rate of H$_2$ cross-over through the membrane of the MEAs. The current density can be converted into a volumetric gas flow rate by using Faraday's Law assuming ideal gas behaviour. In accord with the OCV measurements in FIG. 1, the H$_2$ gas cross-over rate is much lower for Example 1 (2.1 cm$^3$ min$^{-1}$) compared with Comparative Example 1 (12 cm$^3$ min$^{-1}$) and is close to Comparative Example 2 (1.6 cm$^3$ min$^{-1}$). The H$_2$ gas cross-over rate is much lower through the composite membrane of Example 1 compared to the composite membrane of Comparative Example 1 and is close to the H$_2$ gas cross-over rate through the unreinforced Flemion SH-30 membrane, which is a fundamental property of the proton conducting membrane electrolyte.

To further confirm that the composite membrane of Example 1 has a much improved gas tightness compared with Comparative Example 1, the N$_2$ gas leak-rate from anode to cathode was measured at 25° C. using a pressure differential of 34 kPa abs from anode to cathode. N$_2$ at 134 kPa abs was admitted to the anode and the cathode outlet opened to ambient air conditions. The N$_2$ gas exiting the cathode outlet was collected in a graduated cylinder submerged in water to determine the volume of N$_2$ by H$_2$O displacement. The N2 gas leak rate of Example 1 (2 cm$^3$ min$^{-1}$) was significantly lower than Comparative Example 1 (43 cm$^3$ min$^{-1}$) and much closer to Comparative Example 2 (0 cm$^3$min$^{-1}$). The composite membrane of Example 1 is significantly more leak tight than the composite membrane of Comparative Example 1, and is much closer to the un-reinforced Flemion SH-30 membrane of Comparative Example 2.

Table 1 lists the OCVs, H$_2$ gas cross-over and N$_2$ gas leak-rate measurements for the MEAs of Example 1, Comparative Example 1, and Comparative Example 2. All measurements show the composite membrane of Example 1 is much more gas tight than the composite membrane of Comparative Example 1. The composite membrane of Example 1 has a comparable gas leak tightness to the un-reinforced Flemion SH-30 membrane of Comparative Example 2.

TABLE 1

| | OCV (V) | H$_2$ gas cross-over (cm$^3$min$^{-1}$) | N$_2$ gas leak-rate (cm$^3$min$^{-1}$) |
| --- | --- | --- | --- |
| Example 1 | 0.955 | 2.1 | 2 |
| Comparative Example 1 | 0.933 | 12 | 43 |
| Comparative Example 2 | 0.961 | 1.6 | 0 |

Dimensional Stability Measurements

The dimensional stability of the composite membrane of the invention (Example 2) was measured and compared with both un-reinforced Flemion SH-30 membrane (Comparative Example 2) and an un-reinforced membrane prepared using the same Flemion FSS-1 ionomer material and the same production route (Comparative Example 3) used to prepare the composite membrane of the invention in Example 2.

Prior to the dimensional stability measurements the membrane samples were pressed at 150° C. and a pressure of 234 psi abs for 2 minutes so that the measurements more closely reflected the dimensional stability of the membrane in an MEA. 6 cm×6 cm samples of the membranes were cut, placed between sheets of filter paper, and then placed between glass sheets. The membranes were dried for 2 to 2.5 hours at 60° C. under vacuum. The dimensions of the dry membrane were measured. The membranes were subsequently boiled in water for one hour and then cooled to room temperature. The dimensions of the wet membrane were measured. The wet membranes were larger than the dry membranes, and the percentage expansion was calculated.

Table 2 shows the percentage expansion of the membrane samples due to hydration in terms of both the x and y dimensions and the increase of membrane area. The composite membrane of the invention (Example 2) shows a 2% increase in the x dimension, a 16% increase in the y dimension and an 18% increase in area, compared with a 12% increase in the x dimension, a 38% increase in the y dimension and a 45% increase in the area for Flemion SH-30 (Comparative Example 2) and a 25% increase in both the x and y dimensions and a 44% increase in area for the membrane prepared from the Flemion FSS-1 ionomer solution (Comparative Example 3). This shows that the composite membrane of the invention (Example 2) shows a significantly improved dimensional stability on hydration in terms of both the x and y dimensions and the increase of area compared with un-reinforced Flemion SH-30 (Comparative Example 2) and an un-reinforced membrane prepared from Flemion FSS-1 ionomer solution (Comparative Example 3). This is achieved even although the water take-up of the composite membrane of the invention (Example 2) is 50% higher than Flemion SH-30 (Comparative Example 2) and 15% higher than the un-reinforced membrane prepared from Flemion FSS-1 ionomer solution (Comparative Example 3). In un-reinforced membrane materials higher water-take-up leads to greater expansion of the membrane.

This improved dimensional stability of the composite membranes of the invention, as a consequence the reinforcement, will provide considerable benefit in terms of the ease of manufacture of MEAs incorporating the membranes. The improved dimensional stability is also likely to produce improved durability during prolonged MEA operation by minimising the mechanical stress in an MEA that can arise from the dimensional change of the membrane due to local changes in the level of membrane hydration.

TABLE 2

|  | Dimensional Changes | | |
| --- | --- | --- | --- |
|  | X (%) | Y (%) | Area (%) |
| Example 2 | 2 | 16 | 18 |
| Comparative Example 2 | 12 | 38 | 45 |
| Comparative Example 3 | 25 | 25 | 44 |

The invention claimed is:

1. A composite membrane having a first membrane face, said composite membrane comprising at least one ion-conducting polymer and fibers, wherein the composite membrane has a first region extending from the first membrane face to a thickness of at least 10% and less than 100% of the membrane thickness and the density of fibers in the first region is lower than the density of fibers in the composite membrane as a whole, wherein the first membrane face has a surface area and the first region of the composite membrane covers 100% of the surface area of the first membrane face and wherein the first region of the composite membrane contains less than 10% of the fibers in the composite membrane as a whole.

2. A composite membrane according to claim 1, wherein the fibers are a network of randomly orientated individual fibers.

3. A composite membrane according to claim 1, wherein the thickness of the first region is at least 20% of the membrane thickness.

4. A composite membrane according to claim 1, wherein the thickness of the first region is at least 30% of the membrane thickness.

5. A composite membrane according to claim 1, wherein the first region of the composite membrane contains less than 5% of the fibers in the composite membrane as a whole.

6. A composite membrane according to claim 1, wherein the density of the fibers in the first region is zero.

7. A composite membrane according to claim 1, wherein the composite membrane consists of the first region extending from the first membrane face and a remaining region.

8. A composite membrane according to claim 1, wherein the composite membrane has a second membrane face opposite the first membrane face and comprises a second region extending from the second membrane face to a thickness of at least 10% and less than 90% of the membrane thickness and the density of fibers in the second region is lower than the density of fibers in the composite membrane as a whole, wherein the second membrane face has a surface area and the second region of the composite membrane covers 100% of the surface area of the second membrane face and wherein the second region of the composite membrane contains less than 10% of the fibers in the composite membrane as a whole.

9. A composite membrane according to claim 1, wherein the at least one ion conducting polymers is a proton conducting polymer.

10. A composite membrane according to claim 1, wherein the total thickness of the membrane is less that 200 μm.

11. A composite membrane according to claim 1, wherein the fibers are amorphous silica fibers.

12. A composite membrane according to claim 1, wherein the fibers are incorporated into the composite membrane at a fiber loading of 2 to 25 wt %.

13. A catalysed membrane comprising a composite membrane according to claim 1.

14. A membrane electrode assembly comprising a composite membrane according to claim 1.

15. A membrane electrode assembly comprising a cathode, an anode, and a composite membrane according to claim 7, wherein the first region is adjacent to the cathode.

16. A membrane electrode assembly comprising a cathode, an anode, and a composite membrane according to claim 7, wherein the first region is adjacent to the anode.

17. A composite membrane according to claim 1, wherein the at least one ion-conducting polymer is present in both the first region and in the rest of the composite membrane.

18. A composite membrane according to claim 17, wherein the at least one ion-conducting polymer present in the first region is the same as the at least one ion-conducting polymer in the rest of the composite membrane.

19. A composite membrane according to claim 17, wherein the at least one ion-conducting polymer present in the first region is different from the at least one ion-conducting polymer in the rest of the composite membrane.

* * * * *